United States Patent Office 3,045,828
Patented July 24, 1962

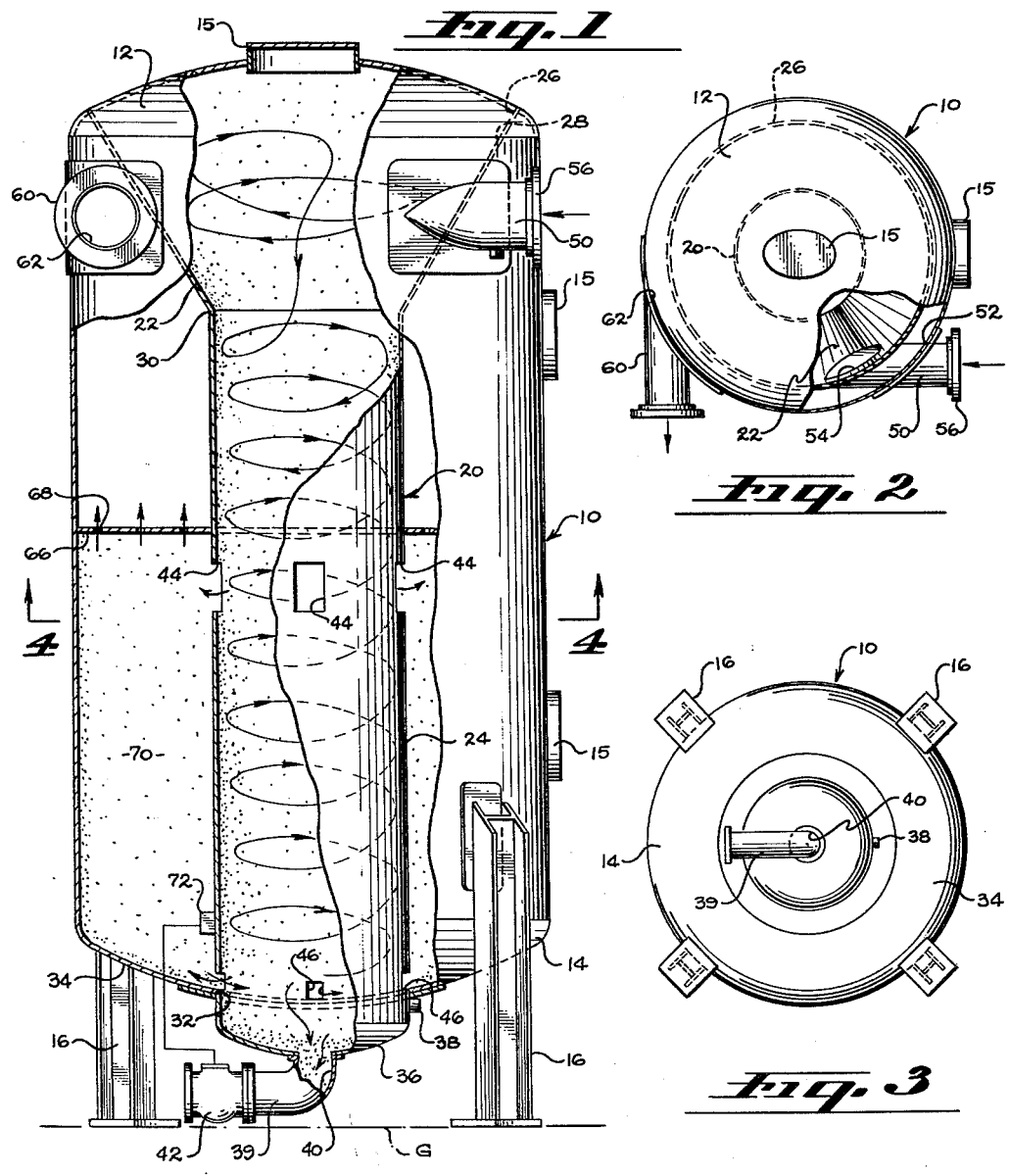
*Fig. 1* *Fig. 2* *Fig. 3* *Fig. 4*
GEORGE W. HUME
INVENTOR
BY William C. Babcock
ATTORNEY

3,045,828
SAND EXTRACTOR
George W. Hume, 5674 Cherry Ave., Long Beach 5, Calif.
Filed Nov. 16, 1959, Ser. No. 853,115
3 Claims. (Cl. 210—112)

This invention relates to the separation of heavier particles from fluid and more particularly to an improved apparatus for separating such heavier particles from fluid.

The many uses for apparatus which separates or extracts particles from a fluid in which the particles are in suspension is well known. Various water purification applications involve such sand and impurity extractors and many specialized applications such as pulp separation and oil field applications are well known. For example, in the drilling of wells, such as oil wells, a drilling fluid commonly termed drilling mud is circulated through the drill string and hole to provide lubrication during drilling and for hole maintenance purposes. The constituency of the mud is important in the drilling operation and it is necessary to remove from the mud sand and other foreign matter which has become suspended therein. That is, the drilling mud has materials suspended in the fluid which are necessary to determine the consistency, density, adhesiveness and other properties of the fluid. When sand or other foreign matter becomes suspended in the fluid it must be removed. It is well known in the art to use vortex separators or other separators utilizing centrifugal force to separate the heavier particles from the lighter fluid carrier.

A conventional vortex chamber has a hollow conically shaped interior with an inlet that is tangentially located with respect to the inner surface of the conical chamber. A particle outlet is located axially at the tapered end of the chamber and a larger axially located outlet is provided at the opposite end of the chamber for the passage of fluid from the separator. When a stream of fluid is introduced into the chamber under pressure it passes through the tangential inlet and a vortex develops in the chamber which subjects any particles in the fluid to centrifugal force. The effect of the centrifugal action is to force solid particles into or toward the periphery of the vortex. Most of the particles are then carried by an outer current helically toward and through the outlet at the tapered end of the chamber. The remainder of the fluid becomes an inner spiral current which moves upward and through the larger outlet at the opposite end of the chamber. As a result, the fluid with all but a small portion of the particles removed therefrom emerges from the fluid outlet while the particles which have been separated, together with a small amount of the fluid, emerges from the outlet at the small diameter of the chamber.

It is an object of the present invention to provide an improved particle extraction apparatus for the extraction of solid particles from a fluid in which the particles are suspended, which apparatus is efficient in operation and removes a greater percentage of the particles from the fluid than do apparatus known to the prior art.

It is another object of the present invention to provide an improved particle extraction apparatus which has a high capacity for extraction of suspended particles from large quantities of fluid which are passed through the apparatus.

It is still another object of the present invention to provide an improved particle extraction apparatus which utilizes a fluid flow course which differs from the fluid flow course employed in vortex-type of apparatus heretofore known to the art.

It is a further object of the present invention to provide such an extraction apparatus which utilizes a quiescent zone in which particles not separated by the fluid flow action are allowed to settle from the fluid prior to the exhaust of the fluid from the apparatus.

Yet another object of the present invention is to provide a particle extraction apparatus which employs centrifugal action and forces in a manner which differs from devices heretofore known to the art.

The present invention is an improved particle separation, or sand extraction, apparatus which includes an outer generally vertically oriented shell having a fluid outlet proximate the upper end thereof. An inner shell is positioned within the outer shell and defines a frusto-conical interior surface extending downwardly convergently from the upper surface of the shell throughout a partial height of the outer shell. The frusto-conical section becomes generally cylindrical in configuration at the lower end thereof and extends downward to a position proximate the lower end of the outer shell. Fluid outlets are provided at a point on the inner shell which is intermediate the upper end of the cylindrical section and the lower end of the outer shell, and additional fluid outlets from the cylindrical section are provided proximate the lower end of the outer shell at the interior thereof. A fluid inlet is provided extending through the outer shell and into the frusto-conical portion of the inner shell. The fluid inlet is tangential to the interior surface of the frusto-conical section.

The novel features which are believed to be characteristic of the present invention both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

In the drawing:

FIGURE 1 is a view partially in section in elevation showing a presently preferred embodiment of the present invention;

FIGURE 2 is an upper plan view of the apparatus shown in FIGURE 1;

FIGURE 3 is a bottom plan view of the apparatus shown in FIGURE 1; and

FIGURE 4 is a partial plan view taken along line 4—4 of FIGURE 1.

Referring now to the drawing, the present invention in its presently preferred embodiment includes, as shown in FIGURES 1 through 3, an outer shell 10 which is formed of steel or other suitable rigid construction material. The outer shell 10 is generally vertically oriented and is cylindrical in configuration with an upper cap 12 and a lower cap 14 affixed to the cylindrically shaped main body portion to form a fluid-tight steel tank in the conventional manner. Suitable access openings and caps 15 are provided at various locations in the outer shell to allow access to the interior thereof. Supports 16 are affixed proximate the lower end of the shell to maintain it in its vertical orientation and to position the lower end of the shell 10 at a substantial distance above the ground level G. In the embodiment shown structural beams are welded or otherwise affixed to the exterior surface of the shell to form the support 16.

Positioned within the outer shell 10 is an inner or separating shell 20 which is positioned symmetrically with respect to the longitudinal or vertical center line of the outer shell 10. Again the inner shell 20 is formed of rigid structural material such as steel. The inner shell 20 includes an upper portion 22 which is frusto-conical in configuration and a lower portion 24 which is generally cylindrical in configuration and of relatively constant diameter. The lower portion 24 of the inner shell 20 is coextensive with the upper portion. The upper frusto-conical portion extends from a junction point 26 at which it is in fluid-tight engagement with the upper end 12 of the outer shell 10. Since the wall of the upper portion 22 of the inner shell is frusto-conical it abuts the inner surface of the upper cap 12 along the circular junction line 26 as shown particularly in FIGURE 2. The upper portion at the juncture line is welded or otherwise affixed to the interior surface of the outer shell in such manner that it forms a substantially fluid-tight contact therewith.

The inner surface 28 of the upper portion of the inner shell is downwardly and inwardly convergent and is symmetrical with respect to the center line of the apparatus. The smaller or lower diameter of the frusto-conical portion 22 of the inner shell is equal to the diameter of the lower cylindrical portion 24 of the shell such that they meet at the point 30 and the inner shell assumes the constant cylindrical form from the point 30 to the lower end of the outer shell. The height of the conical section 22, as well as the slope of the interior wall thereof, and the diameter of the cylindrical section 24 of the inner shell, are interdependent and can be determined by one skilled in the art for optimum performance in a given application in view of the disclosure contained herein.

For purposes of illustration, the interior diameter of the outer shell is sixty inches while the interior diameter of the cylindrical portion of the inner shell is twenty-four inches. The over-all height of an illustrative embodiment is ninety-six inches.

An opening 32 is provided through the lower end 34 of the outer shell, which opening is substantially equal in diameter to the outer diameter of the cylindrical portion 24 of the inner shell. The length of the inner shell 24 is such that the cylindrical portion extends through the opening 32 with the outer end 36 of the inner shell being at a substantial distance beneath the lower end 34 of the outer shell. An access opening and closure 38 are provided through the wall of the inner shell beneath the lower end, or exteriorly of the outer shell. The opening 32 is welded or otherwise made fluid-tight to retain the fluid-tight integrity of the apparatus. A discharge pipe 39 is connected to the lower end 36 of the inner shell and is coextensive with a particle outlet 40 therefrom. The height of the support 16 and the distance by which the inner shell extends through the end wall 34 of the outer shell is such that an elbow or similar fitting can be connected to the particle outlet opening 40 and a discharge valve 42 placed into the outlet line 39.

At a point intermediate the height of the inner shell 20 a plurality of fluid ports 44 are provided through the wall of the cylindrical portion 24 of the inner shell 20. The fluid outlet ports 44 are circumferentially spaced around the cylindrical wall of the inner shell. In the embodiment shown four such ports 44 are utilized and accordingly spaced at 90-degree intervals. The arcuate width of the ports 44 is such that a substantial distance exists between the adjacent ports. For example, in the embodiment shown the ports are approximately fifteen inches in width and are eleven inches in height. A second series of circumferentially spaced fluid outlet ports 46 are provided through the wall of the cylindrical portion 24 of the inner shell at a point proximate to or adjacent the interior wall of the lower end 34 of the outer shell 10. In the embodiment shown four such fluid ports 46 are used and are accordingly spaced at 90-degree intervals. The lower fluid outlet ports 46 are substantially smaller in cross-sectional area than the upper fluid ports 44. In the illustrative embodiment shown the lower fluid ports 46 are approximately two inches in height and two inches in width.

A fluid inlet line 50 is connected to and extends through the outer shell 10 at a point proximate the upper end of the outer shell, which point is approximately the mid-point of the height of the conical section 22 of the inner shell. Thus, as shown particularly in FIGURES 1 and 2, a fluid inlet line 50 extends through a suitable opening 52 in the wall of the outer shell and is connected to the conical wall of the inner shell such that it is coextensive with the fluid opening 54 through the wall of the conical portion 22. Suitable fittings 56 for connection of the conduit to the inlet line 50 are provided. Thus, fluid flowing through the fluid inlet line 50 passes from the exterior of the apparatus directly into the conical section of the inner shell. The fluid inlet line 50 and the fluid opening 54 into the inner shell are oriented such that the fluid inlet 54 is approximately tangential to the circumference of the conical section 22. That is, the fluid inlet line 50 is offset from the parallel diameter through the apparatus by a distance sufficient to position the fluid inlet opening 54 at a point which is tangential to the conical interior surface 28 of the inner shell. A fluid outlet line 60 is also connected to the apparatus such that it is substantially tangential to the outer shell. That is, as shown particularly in FIGURES 1 and 2, a fluid outlet line 60 is welded or otherwise affixed to the outer shell such that it is coextensive with the fluid outlet opening 62 through the wall of the outer shell. The fluid outlet opening is positioned at approximately the same height as the fluid inlet opening but being tangential to the outer shell the opening 62 occurs through the wall of the outer shell at a position outwardly of the conical section 22 of the inner shell. Thus, fluid admitted to the apparatus through the fluid inlet line 50 will pass directly into the inner shell on a path tangential to the inner conical wall of the inner shell. Fluid passing from the apparatus through the fluid outlet line 60 will pass from the outer shell and from the space between the outer shell and the conical portion of the inner shell.

Thus, the exterior wall of the inner shell and the interior wall of the outer shell define an annular space therebetween which is of relatively constant width from the lower end of the apparatus to the position at which the constant diameter cylindrical section 24 of the inner shell terminates. Above this point the width of the annular space decreases by having an increased inside diameter. The fluid outlet line from the outer shell is positioned at a point approximately intermediate the height of the conical section.

A baffle plate 66, as shown in detail in FIGURES 1 and 4, is positioned transversely with respect to the apparatus at a point intermediate the height of the apparatus and above the position of the fluid outlet ports 44. The baffle plate 66 is thus horizontally oriented with respect to the relatively vertical orientation of the apparatus. The baffle plate defines an inside diameter substantially equal to the outside diameter of the cylindrical portion 24 of the inner shell and has an outside diameter substantially equal to the inside diameter of the inner shell 20. The baffle plate is welded or otherwise suitably affixed to both the inner and outer shells and is securely positioned as shown in FIGURE 1. A plurality of relatively small openings are provided through the baffle plate to allow the passage of fluid therethrough while restricting the passage of particles. That is, the openings 68 are not sufficiently small to prevent the passage of particles therethrough but are sufficiently small to provide a baffle or series of restrictions which inhibit the passage of particles. For example, in the embodiment shown the openings 68 are approximately three-fourths inch in diameter.

The operation of the apparatus of the present invention will be reasonably apparent from the foregoing detailed description. Fluid having suspended therein the particles which are to be separated is admitted to the apparatus under pressure through a fluid inlet line which is connected to the fitting 56 such that the fluid passing into the apparatus passes at high velocity through the fluid inlet line 50 and the fluid inlet opening 54. The fluid under pressure being admitted in a tangential direction follows the interior wall of the conical portion 22 of the inner shell and a swirling, vortex spiral of liquid results therefrom that moves downwardly and forwardly by gravity along the interior surface of the upper shell portion 22. Particles of sand and other foreign material carried with the liquid as the liquid discharges into said shell portion will vary in size and density. These particles borne by the swirling vortex spiral are in rotary motion about a vertical axis (not shown) of the shell portion 22, and are subjected to a centrifugal force that tends to move the particles toward the interior surface of the shell portion. This centrifugal force is opposed by the resistance offered by the liquid to the movement of any foreign body therethrough.

The centrifugal force exerted on each of the heaviest particles will be high relative to the opposing force offered by the liquid to the movement of a body therethrough. Consequently, the heaviest particles which will normally be large pieces of sand, will tend to concentrate adjacent the interior face of shell portion 22, and while continuing to rotate with the vortex liquid spiral, will move downwardly therein by force of gravity. The centrifugal force acting on the smallest particles suspended in the liquid discharged into the shell portion 22 may be but slightly greater than the opposing force offered by the liquid to movement of a foreign body therethrough. Therefore, but slight movement of each of these lightest particles toward the interior surface of the shell portion 22 will take place during the time the unit volume of liquid in which it is suspended rotates within this shell portion.

In FIGURE 1 it will be seen that the shell portion 22 diverges downwardly and inwardly, with the radius of the upper part of this shell portion being slightly less than two and one-half feet, and the lower edge of the shell being approximately one foot, on the basis of the dimensions previously cited herein for illustrative purposes.

From these dimensions, it will be seen that the angular velocity of the peripheral unit volume of liquid in the upper part of shell portion 22 will be increased by approximately two and one-half times when it has moved downwardly to the lower edge of the shell portion 22. Due to this increased angular velocity, the centrifugal force on particles of foreign material suspended in the unit volume of liquid has increased substantially, and to the extent that particles intermediate in weight between the heaviest and lightest particles concentrate adjacent the lower interior surface of shell portion 22.

The downward velocity of the liquid vortex increases as it flows downwardly from the upper portion of the shell portion 22 to the upper part of shell portion 20, due to the great decrease in transverse cross-sectional area which the liquid encounters during such flow. This increased velocity increases the downward velocity of all the suspended particles, which increased downward velocity is continued until they settle on the upper surface of the lower end 36.

After initial operation of the invention, the lower shell portion 20 and a substantial part of the upper shell portion 22 are filled with liquid, as is the chamber 70, up to the lower interior surface of discharge pipe 60. The frictional resistance offered by the interior surface of lower shell portion 20 to rotation of the downwardly moving liquid is substantial, and by the time a unit volume of liquid has moved downwardly to ports 44, the major portion of its rotary motion has been lost. Thus, the heaviest and intermediately heavy particles previously concentrated along the interior surface of shell portion 22, and the upper part of lower shell portion 20, have little tendency to move out through the ports 44 as they pass downwardly thereby. Instead, due to the increased velocity thereof, they continue downwardly to settle on the upper surface of lower end 36. The lightest particles which did not initially concentrate along the interior surfaces of upper shell portion 22 and the upper part of lower shell portion 20, obviously will not tend to pass outwardly through ports 44, for the major movement of the liquid in which they are suspended is flowing downwardly at the time these lightweight particles pass the ports 44.

Thus it will be seen that the functions of the shell portion 20 are to increase the rate at which the liquid entering same moves downwardly, to frictionally dampen out the swirling motion of the downwardly moving liquid, permit flow of liquid from the interior of the shell portion 20 outwardly through the ports 44, and to cooperate with the lower end 36 to define a zone in which the downwardly moving particles collect to be periodically discharged through the drain line 39.

After flowing from ports 44, the liquid has little rotary motion. However, any rotary motion still remaining therein is removed when the liquid comes into frictional contact with baffle 66, and the upwardly flowing liquid is momentarily broken up into a large number of upwardly moving fluid columns as it flows through the perforations 68. The water in chamber 70 below ports 44 is quiet, and provides ideal conditions for any foreign particles therein to settle out by gravity onto the upper surface of bottom 34.

To further assure that maximum separation of particles will take place prior to discharge of liquid from the invention, the direction of liquid flow through pipe 60 is in the opposite direction to that in which liquid in chamber 70 would tend to rotate. The size of ports 44 can be substantial without any appreciable outward flow of liquid therethrough from the interior of lower shell portion 20, for the downwardly moving column of liquid in shell portion 20 has lost the major portion of its rotary motion by the time it reaches the ports 44.

The ports 46 are preferably smaller in size relative to ports 44. When the valve 42 is placed in the open position, liquid flows rapidly from the lower end of lower shell portion 20 and carries the foreign particles therewith. Concurrently liquid is drawn from the lower portion of chamber 70 and carries particles of foreign material deposited on the upper surface of lower cap 34 therewith through ports 46. This liquid and particles carried therewith through ports 46 discharge downwardly from the lower end of lower shell portion 20 through valve 42. After this discharge of deposited material from the lower end of chamber 70 and lower part of lower shell portion 20, the valve 42 is placed in the closed position. The valve 42 can be regulated by automatic means such as a switch 72 which will open the valve periodically to remove the sediment from the apparatus when the sediment reaches a predetermined height.

Thus, the present invention provides a sand extraction or particle separation apparatus which is highly efficient and which has a high capacity. The percentage of particles removed from the fluid passing through this apparatus is extremely high and a higher efficiency of separation is obtained by means of the improved apparatus.

What is claimed is:

1. An improved apparatus for separating particles of solid material of various sizes and weights from a liquid, comprising: an outer vertical cylindrical shell that includes a bottom; a top closing the upper end of said shell; an inner shell longitudinally disposed in said outer shell, said inner shell including an upper frusto-conical portion that converges downwardly a substantial distance from the interior surface of said top, and a cylindrical portion that extends downwardly from said frusto-conical portion to pass through an opening in said bottom and terminate in a closed end having a discharge opening formed therein, said cylindrical portion having a transverse cross section that is substantially smaller than the transverse cross section of said upper frusto-conical portion, said cylindrical portion having a plurality of first ports formed therein intermediate said top and bottom, and a plurality of second ports that are partially defined by lower edges of no greater elevation than the top surface of said bottom; means for sealingly connecting said cylindrical portion to said bottom; a horizontal liquid inlet line extending through the upper portion of said outer shell to terminate in an opening in said frusto-conical portion tangential to one quadrant thereof, with said liquid containing said suspended particles when discharged through said pipe into said frusto-conical portion having a vortex motion imparted thereto by which said particles of greatest weight move outwardly by centrifugal force towards the interior surface of said frusto-conical shell, said liquid by gravity flowing downwardly in said cylindrical portion towards said closed end at a substantially greater downward velocity than that of said liquid when in said frusto-conical portion, with said vortex motion of said liquid decreasing in said cylindrical portion as said liquid flows downwardly therein due to frictional resistance offered by said cylindrical portion, said downwardly flowing liquid discharging from said first ports, but said particles due to the increased rate of downward flow of said liquid in said cylindrical portion and the decrease in vortex motion of said downwardly flowing liquid continuing to travel downwardly past said first ports to settle on the upper surface of said closed end, which liquid discharges through said first ports to enter an annulus-shaped chamber defined between said outer shell and inner shell; a horizontal ring-shaped baffle extending between said cylindrical portion and said outer shell above said first ports, said baffle having a plurality of openings formed therein; a normally closed valve in comunication with said discharge opening; and a liquid outlet line normal to said inlet line that is in communication with said chamber above said baffle and through which liquid discharges in a direction opposite that in which it tends to rotate in said chamber, said baffle by friction tending to remove any rotary motion said liquid may have as it flows upwardly through said openings, said second ports being of sufficiently small cross section that liquid at a substantial velocity flows therethrough to carry foreign material therewith deposited on said bottom cap into said cylindrical portion of said inner shell to discharge therefrom with the balance of said settled out particles when said valve is placed in an open position.

2. An apparatus as defined in claim 1 wherein said closed end is disposed a substantial distance below said bottom, with said closed end and bottom cooperatively defining a space in which a substantial quantity of said particles can settle before said settled-out particles start to obstruct said second ports.

3. An apparatus as defined in claim 1 wherein means are provided for automatically opening said valve when said particles have settled out to a depth to reach a predetermined elevation above said bottom.

References Cited in the file of this patent

UNITED STATES PATENTS

| | | |
|---|---|---|
| 1,100,435 | Lance | June 16, 1914 |
| 1,202,356 | Blackmer | Oct. 24, 1916 |
| 1,761,627 | Hine | June 3, 1930 |
| 2,098,608 | Berges | Nov. 9, 1937 |
| 2,301,371 | Corwin | Nov. 10, 1942 |
| 2,790,554 | Work | Apr. 30, 1957 |